United States Patent [19]

Santoro

[11] 4,323,937

[45] Apr. 6, 1982

[54] TAPE RECORDERS OF THE CASSETTE TYPE

[76] Inventor: Giovanni Santoro, Via Campodimele 55, Roma, Italy

[21] Appl. No.: 143,534

[22] Filed: Apr. 25, 1980

[30] Foreign Application Priority Data

Apr. 30, 1979 [IT]   Italy .............................. 48897 A/79

[51] Int. Cl.³ ...................... G11B 15/24; G11B 15/18
[52] U.S. Cl. .................................... 360/96.6; 242/198
[58] Field of Search ................... 360/96.5, 96.1–96.4, 360/96.6, 92, 93, 132, 105; 242/197–200

[56] References Cited

U.S. PATENT DOCUMENTS 4,184,182  1/1980  Santoro ........................ 242/198 X

FOREIGN PATENT DOCUMENTS 2919575 11/1979  Fed. Rep. of Germany ..... 360/96.5

Primary Examiner—John H. Wolff

[57] ABSTRACT

The specification discloses a mechanism for controlling the introduction and braked ejection of a tape cassette for use in cassette tape recorders employing a plate having a central tongue integrally formed therewith to be slightly bent downwardly in an intermediate position, the plate also being provided with an abutment pin for cooperation with the introduction and ejection lever of the mechanism.

6 Claims, 10 Drawing Figures

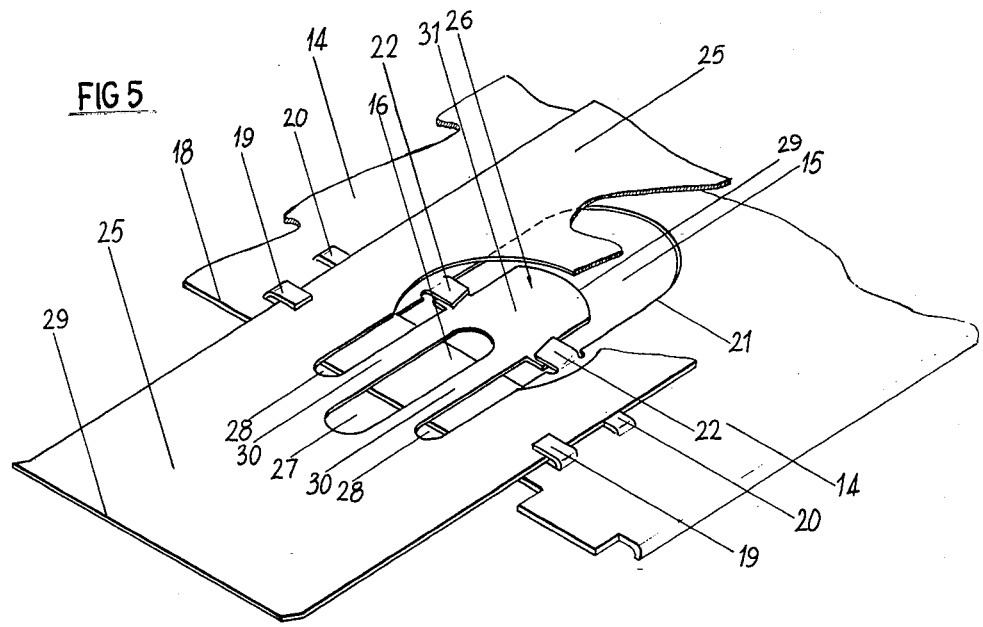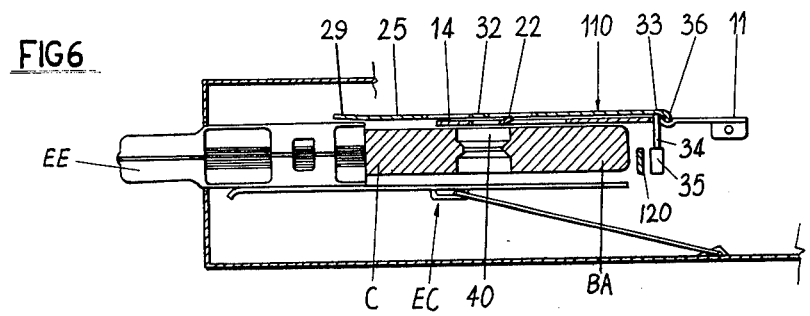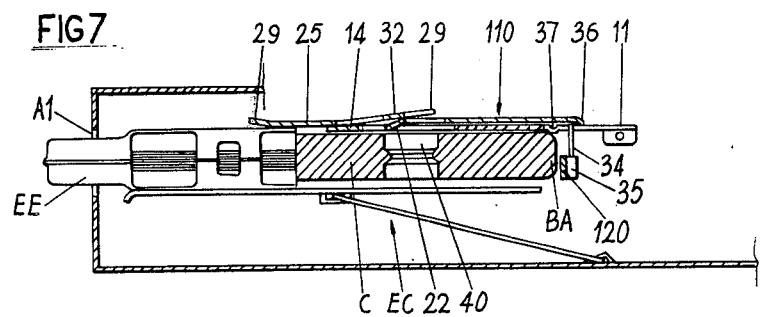

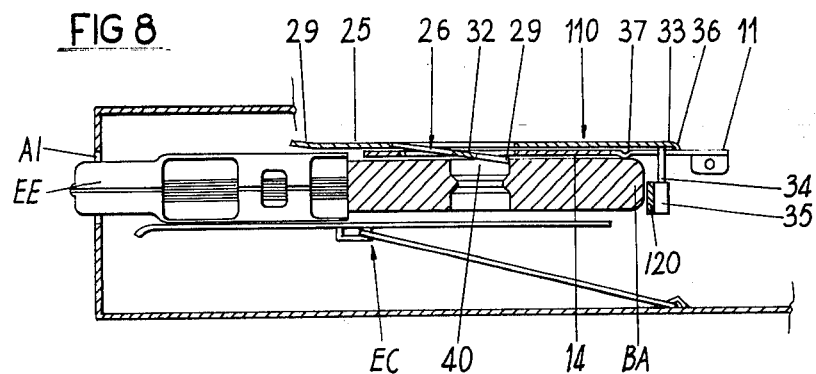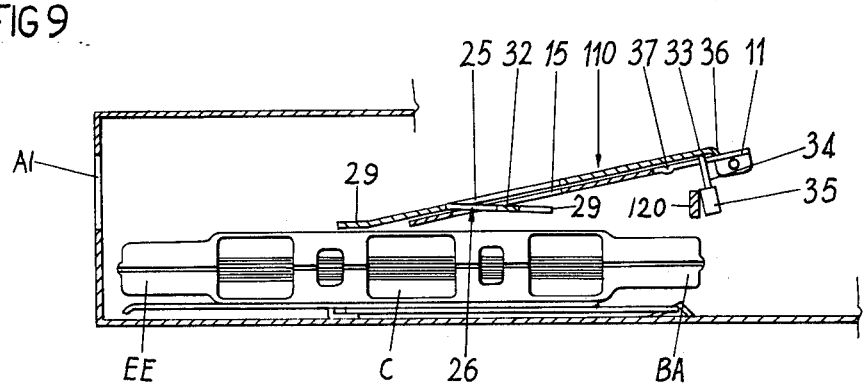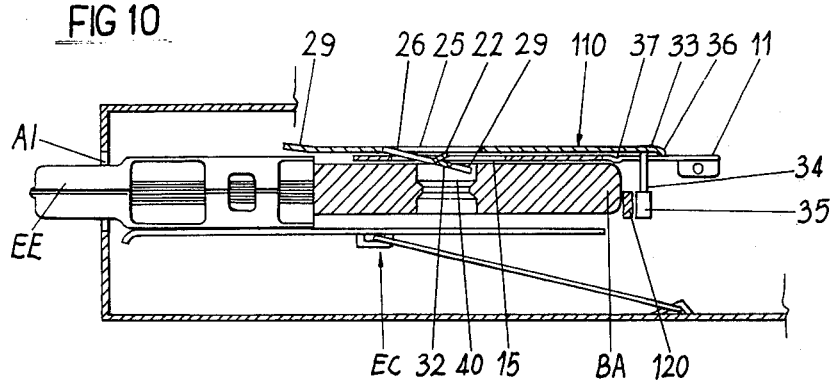

TAPE RECORDERS OF THE CASSETTE TYPE

This invention refers to a mechanism for automatically controlling the introduction and "braked" ejection of the magnetic tape cassette to be used in cassette tape recorders and particularly in cassette tape recorders for car radio sets.

In this field, the particular conditions in which the cassette tape recorders providing car radio sets are used by the vehicle driver, who must never put his mind off the drive, make it necessary to make all the operations relative to the cassette playback, i.e. introduction, fast forward and rewind and ejection thereof as automatic as possible.

Particularly, the invention refers to a mechanism making the cassette introduction and braked ejection automatic, to be used in association with two mechanisms subject matter of relative patent applications filed in the name of the same applicant and, more particularly, the mechanism for moving the cassette subject matter of U.S. Pat. No. 4,184,182 matter of U.S. Ser. No. 222,794 filed Jan. 5, 1981.

At present, it is possible to find on the market some recorders wherein the cassette introduction has been made automatic and other recorders provided with a braking action. However, these recorders are rather bulky and very complex as they comprise a considerable number of parts.

The mechanism of the invention comprises a single piece obtained by simple operations of shearing and partial shearing and associated to a part of the mechanism subject matter of the above mentioned U.S. Ser. No. 222,794 more specifically to the suitably modified control lever thereof.

This single piece comprises a plate preferably made from steel, having a central tongue integrally formed therewith. This tongue is preformed in order to be slightly bent downwardly at an intermediate position thereof. The plate is also provided with an abutment pin adapted to cooperate with the introduction and ejection lever of the mechanism subject matter of the above mentioned U.S. Ser. No. 222,794.

The plate is suitably supported on the control lever for sliding thereon from an advanced position to a retracted position and the tongue is adapted to cooperate with a means on the control lever for swinging in respect of the plate plane from a lowered position, where it is engaged with the cassette to a raised position where it is disengaged therefrom.

Furthermore, between the advanced and retracted positions of the plate and then of the tongue there is an intermediate stop position wherein the tongue is still engaged with the cassette and the plate is close to the end of the stroke towards the advanced position.

The invention will be now described in detail with reference to the annexed drawings, wherein:

FIG. 5 is a similar view showing the cassette engaging member at an intermediate position during the ejection of the cassette; and, FIGS. 6 to 10 are longitudinal vertical sections of the whole unit during the different steps of introduction and braked ejection of the cassette.

As mentioned above, the mechanism of the invention is adapted to cooperate with the control lever of the mechanism for moving the cassette subject matter of U.S. Pat. No. 4,184,182 here referred to with reference 110 and with loading and ejection lever 120 of loading and ejection unit 4 subject matter of U.S. Ser. No. 222,794 which lever is shown in FIG. 1 together with the spring thereof, but without the remaining part of the mechanism.

Furthermore, while control lever 110 has been suitably modified, lever 120 has not been changed.

Figure 1:
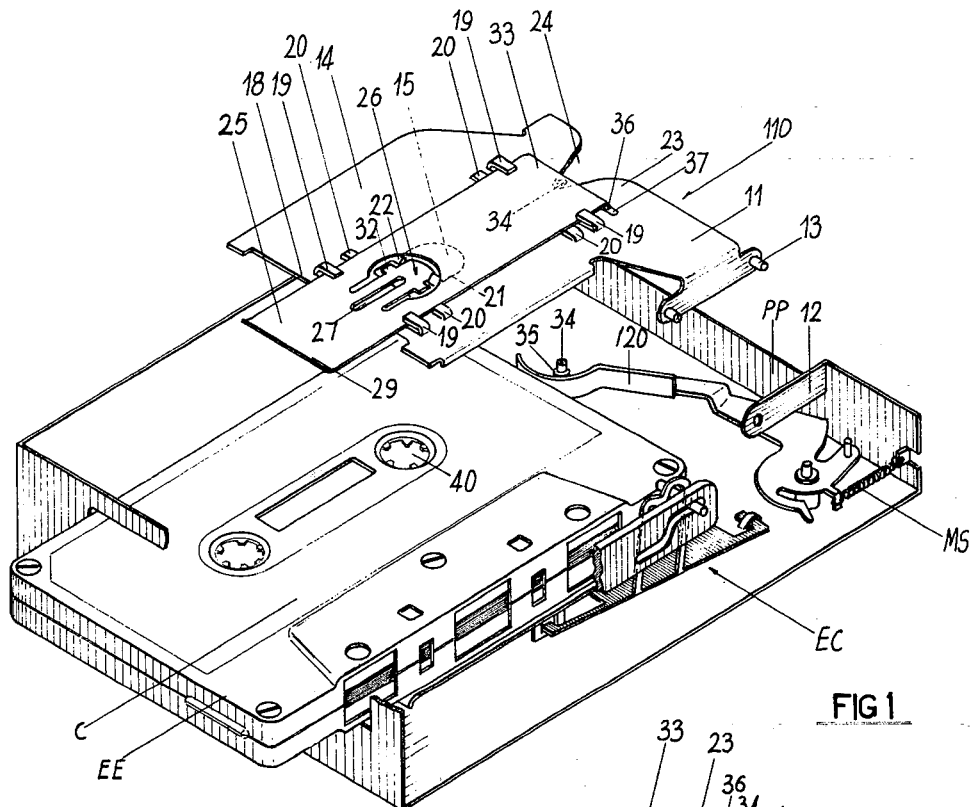
FIG. 1 is a partially exploded perspective view of the whole unit.

Lever 110 comprises a base portion 11 suitably pivoted on tabs 12 of rear wall PP of the recorder through aligned pins 13, only one of these elements being shown in FIG. 1, so as to swing from the raised position of FIG. 8 to the lowered position of FIG. 9.

A substantially square cassette engaging or pushing portion 14 (shown in more detail in the fragmentary views of FIGS. 3, 4 and 5) is integrally formed with base portion 11, which portion 14 comprises a wide opening 15 substantially having the shape of an elongated horseshoe, outer straight side 16 of opening 15 being parallel to front edge 18 of pushing portion 14.

Pushing portion 14 comprises four tabs 19 bent at right angle and located at the corners of a rectangle having its sides in alignment with the sides of portion 14 and four teeth 20 located at the corners of a square internal to the rectangle, tabs 19 and teeth 20 being formed by partial shearing operations.

Furthermore, a protruding tab 22 is formed at the end of both arcuated sides 21 of opening 15, adjacent to straight side 16.

As clearly seen in the drawings, each tab 22 is upwardly inclined in respect of the plane of portion 14, the lower ends of tabs 22 being adjacent to straight side 16 of opening 15.

Finally, in rear portion 23 of base 11 of lever 110 (see FIG. 1) a V-shaped notch 24 is formed, the apex of which lies on the longitudinal axis of opening 15.

A substantially rectangular plate 25 is mounted on portion 14, this plate 25 being as wide as the distance between the raised edges of the two opposite pairs of teeth 20, so as to be guided thereby, and having such a thickness as to be able to slide below tabs 19 on portion 14 without, however, raising in respect thereto.

A tongue 26 is integrally formed with plate 25 due to a central round-ended opening 27 formed therein and embracing openings 28 joining with an arcuated portion beyond end 29 of tongue 26.

Figure 2:
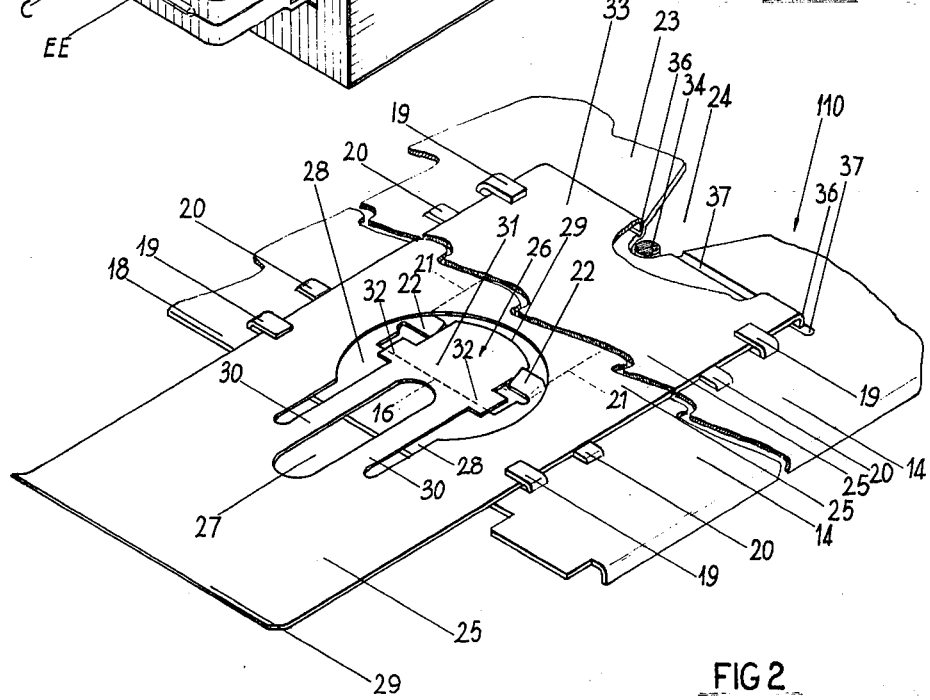
FIG. 2 is a fragmentary perspective view showing the upper portion of the mechanism with the cassette engaging member in the introduction and ejection position.

Tongue 26 thus comprises two spaced "legs" 30 on both sides of opening 27 and a head 31 having an edge 29 and two side tabs 32, as better shown in FIG. 2.

Furthermore, as clearly seen in FIG. 4, tongue 26 is constantly bent downwardly at "legs" 30 thereof, so that its head 31 normally protrudes below the plane of plate 25. Thus, head 31 of tongue 26 is received within opening 15 of portion 14 when plate 25 is mounted in place on lever 110, thus protruding also below this portion 14.

Finally, a downwardly directed pin 34 is integrally formed with rear portion 33 of plate 25, pin 34 having an enlarged head 35 which is received within V-shaped notch 24 when plate 25 is in the assembled condition, the parts being so arranged that pin 34 is located behind the body of lever 120 (FIGS. 6 to 8), i.e. on the right thereof in the figures.

Furthermore, as better shown in FIGS 2 and 6 to 10, rear portion 33 of plate 25 is slightly bent downwardly for the purposes of the invention that will be set forth hereinafter.

In operation, upon starting the introduction of a cassette into the tape recorder, lever 110 lever 120 and plate 25 will be in the position shown in FIGS. 1 and 6. As it is shown, in this position control lever 110 is in the horizontal raised position, loading and ejection lever 120 is located between front edge RA of cassette C and pin 34, spaced from both of them, and plate 25 is in its advanced position.

Since when plate 25 is in this advanced position the position of tabs 22 of portion 14 relative to tabs 32 of head 31 of tongue 26 is important, which position is shown in FIG. 2, reference will be now made to this figure.

Figure 3:
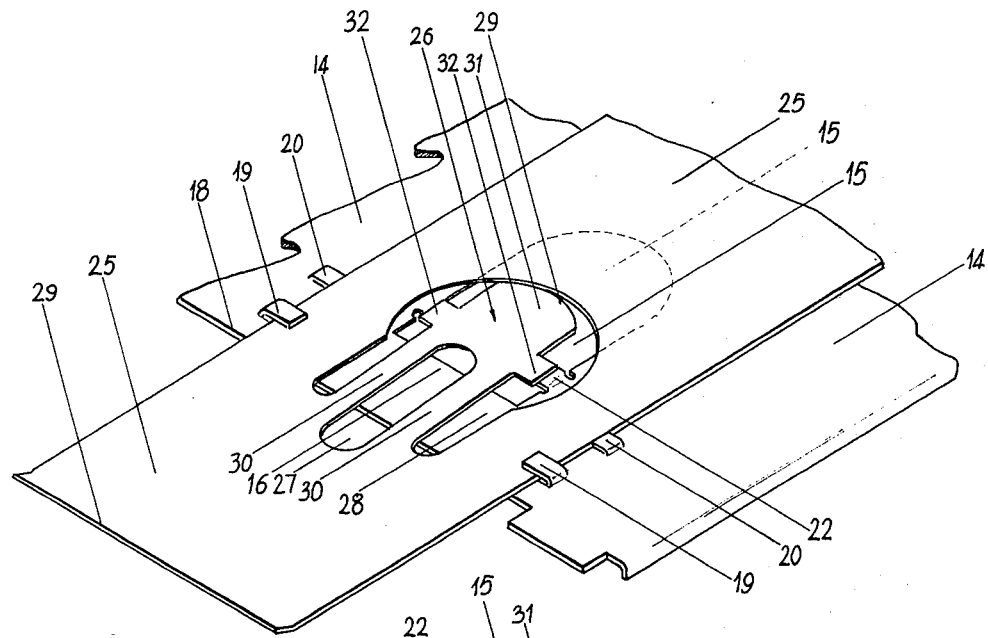
FIG. 3 is a view similar to FIG. 2 showing the cassette engaging member at an intermediate position during the introduction of the cassette.

A further introduction of the cassette will cause edge RA of the cassette to abut against lever 120 and this lever 120 to engage head 35 of pin 34. Accordingly, owing to this situation the continued movement of the cassette will be transmitted to plate 25 which will start to move backwards while tabs 32 of tongue 26 climb into tabs 22 due to the slope thereof and, accordingly, the situation will be as shown in FIGS. 3 and 7. In this position tongue 26 will be elastically loaded since, owing to the pre-bending of legs 30 thereof, this tongue would arcuate downwardly as the gripping action exerted thereon by straight edge 16 of opening 15 is released owing to the backward movement of tongue 26, while this downward movement is opposed by tabs 22 that are placed below tabs 32.

Figure 4:
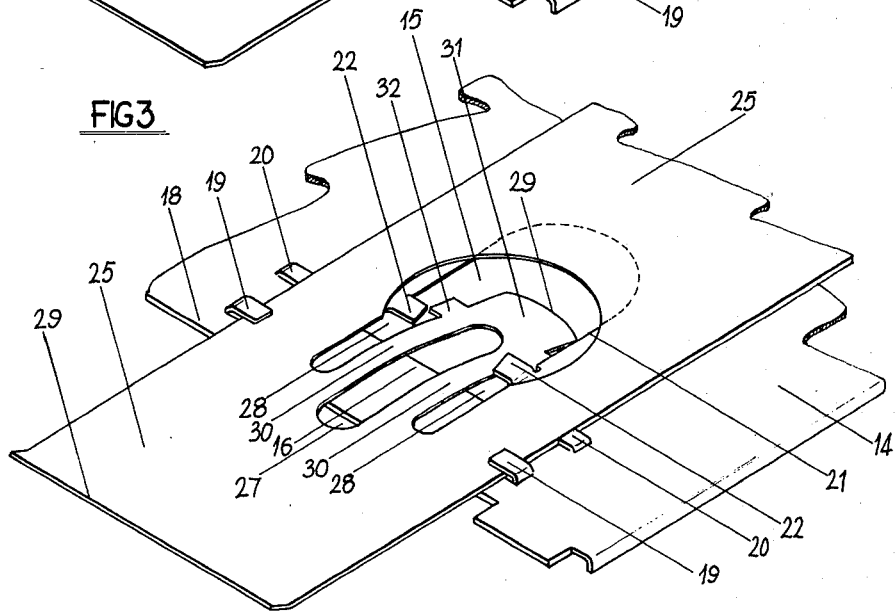
FIG. 4 is a similar view showing the cassette engaging member in the position of complete introduction of the cassette.

However, as the inwardly directed movement of the cassette being introduced into the tape recorder, which movement is transmitted to plate 25 as mentioned above, has caused tabs 32 to climb onto tabs 22, tongue 26 being now free will snap downwardly into the position shown in FIGS. 4 and 8. However, since at this point of the stroke of cassette C lever 120 and plate 25 one of the two circular cavities for receiving the two tape winding up reels providing each cassette is now located below head 31 of tongue 26, head 31 will move below the upper edge of cavity 40.

At this point, as described in the above mentioned patent application, since loading and ejection lever 120 has passed the dead point of the stroke wherein it is loaded, thus storing energy, this lever will be pulled towards rear wall PP of the tape recorder. The movement of this lever will be transmitted to plate 25 and from this plate to cassette C owing to the engagement of edge 29 of tongue 26 with the wall of cavity 40 (FIG. 8). Accordingly, during the last length of the introduction stroke cassette C will be pulled into the tape recorder. At the end of this pulling stroke the cassette will be brought in the record and playback position, namely in its lowest position, owing to the action of the mechanism for controlling the cassette comprising lever 110 which snaps into the lowered position, thus creating the situation of FIG. 9.

Upon the necessary ejection of the cassette, once the playback thereof is over, raising mechanism EC will move the cassette back to the raised position while lever 120, as it will be understood from the above mentioned patent application involved, which is biassed by spring MS (FIG. 1) will cause cassette C to be ejected through introduction and ejection opening A1. This movement will be transmitted also to plate 25 owing to the abutting of the wall of cavity 40 against edge 29 of tongue 26.

During this ejection stroke tongue 26 will be pushed to raise against the pre-bended shape thereof due to the camming action exerted thereon by edge 16 of opening 15. This raising, however, is prevented by the force engagement of tabs 32 of head 31 below tabs 22 of opening 15 (FIG. 5).

Since this forced engagement generates a dragging force exceeding the ejection force exerted by spring MS, the ejection stroke of the cassette and the stroke of cassette pushing lever 120 will stop at the position of FIGS. 5 and 10.

At this point the complete ejection of the cassette will be performed manually by gripping with the fingers outer end EE of the cassette protruding outside of introduction and ejection opening AE and exerting a force sufficient to cause tabs 32 of tongue 26 to overcome elastically the constriction consisting in tabs 22, thus resuming the situation shown in FIGS. 2 and 6.

Stop of cassette C in the position shown in FIGS. 5 and 10 is very important since, otherwise, cassette C would be thrown out of ejection opening AE and, accordingly, within the passanger compartment of the vehicle wherein the car radio set is mounted and this could dangerously put the mind of the driver off the drive.

Finally, the downward bending of portion 33 causes edge 36 to engage groove 37 of portion 10, thus blocking plate 25 against any backwards movements. The torque due to the pushing action of lever 120 on pin 34, deflecting upwardly portion 33, then causes edge 36 to disengage from groove 37.

It should be understood that the slightly arcuated front edge 29 of tongue 26, or even the whole head 31 thereof can be covered with a yielding rather high friction material in order to improve the engagement action with the wall of cavity 40 of the cassette.

It is intended that the invention is not limited to the use thereof in combination with loading and ejection lever 120, as this invention resides in the construction of plate 25 and tongue 26 thereof which is adapted to perform the necessary movements for engaging, moving and blocking cassette C. Accordingly, the invention also comprises an embodiment, even if it is not shown, wherein plate 25 is slidingly mounted on cassette C and it comprises a suitable mechanism provided with an elastic means adapted to store energy during the first length of the cassette introduction stroke and then to release this energy in order to cause the cassette to mechanically perform, through the plate, both the last length of the introduction stroke and the whole ejection stroke up to the blocking position thereof.

I claim:

1. In a magnetic tape recorder of the cassette type comprising a mechanism provided with a suitable elastic means adapted to store energy during the first length of the cassette introduction stroke and then to release this energy both during the last length of said introduction stroke and during the necessary cassette ejection stroke, an improved mechanism for automatically controlling the introduction and "braked" ejection of the cassette, said improved mechanism comprising: a resilient guiding member adapted to perform an alternative sliding movement in parallel relationship with the introduction and ejection stroke on a supporting member placed above said cassette during said introduction and ejection stroke, wherein said supporting member has an elongated opening placed below said sliding guiding member and having a transversal straight edge and a stationary means protruding from the side edge thereof, and wherein said sliding guiding member comprises a rear pin adapted to cooperate with a cooperating member of said energy storing mechanism and a resilient member pre-bent in order to be normally bent in the path of said cassette for engaging the latter through said opening, said pre-bent member having matching protruding means adapted to engage said stationary protruding means in said opening during the alternate movement of said sliding guiding member in order to cause, together with said transversal straight edge of said opening, said elastic member to move from its pre-bent lowered position where said resilient member engages said cassette to a forced raised position where said resilient member does not engage said cassette.

2. The improved mechanism according to claim 1, wherein said stationary protruding means of said opening has a suitably shaped construction so that said matching protruding means of said elastic means member passes over them during the stroke of said sliding guiding member in the direction of the cassette introduction movement and it blocks below said stationary protruding means during the stroke of said sliding member in the direction of the cassette ejection movement, thus generating a dragging force exceeding the ejection force exerted on said cassette by said mechanism.

3. The improved mechanism according to claim 2, wherein said guiding member comprises a steel plate and said elastic member is integrally formed with said plate in the form of a tongue.

4. The improved mechanism according to claim 3, wherein said tongue integrally formed with said plate has such a construction as to engage one of the two cavities wherein the two tape winding up reels of the cassette are received.

5. The improved mechanism according to claim 4, wherein the portion of said tongue engaging said cassette cavity is covered with a rather high friction material.

6. The improved mechanism according to claim 5, wherein the rear portion of said plate mounting said pin is downwardly arcuated so that the edge thereof slides against said supporting member and wherein said pin comprises a small groove adapted to engage said edge, the parts being so arranged that the engagement of said edge with said groove prevents said plate from moving backwards until the pushing action of said cooperating member on said pin, generating a torque deflecting said rear portion upwardly, causes said edge to disengage from said groove thus allowing said plate to move backwards.

* * * * *